(12) United States Patent
Jang et al.

(10) Patent No.: US 7,877,205 B2
(45) Date of Patent: Jan. 25, 2011

(54) METHOD FOR SETTING DESTINATION BASED ON IDENTIFIER OF MOVING OBJECT AND METHOD FOR PROVIDING POSITION INFORMATION

(75) Inventors: In-Sung Jang, Daejon (KR); Wan-Sik Choi, Daejon (KR); Jong-Hyun Park, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 967 days.

(21) Appl. No.: 11/636,129

(22) Filed: Dec. 8, 2006

(65) Prior Publication Data

US 2007/0100539 A1    May 3, 2007

(30) Foreign Application Priority Data

Dec. 8, 2005   (KR) ................ 10-2005-0119422
Jun. 12, 2006  (KR) ................ 10-2006-0052742

(51) Int. Cl.
 *G01C 21/34* (2006.01)
(52) U.S. Cl. ...................................... 701/209
(58) Field of Classification Search ................ None
 See application file for complete search history.

(56) References Cited

U.S. PATENT DOCUMENTS

| 6,049,718 | A  | * | 4/2000 | Stewart ............... 455/456.4 |
| 6,424,910 | B1 | * | 7/2002 | Ohler et al. ............. 701/202 |
| 6,947,834 | B2 |   | 9/2005 | Duckeck |
| 2002/0123355 | A1 | * | 9/2002 | Hosono ............... 455/456 |
| 2003/0016804 | A1 | * | 1/2003 | Sheha et al. .......... 379/201.06 |
| 2003/0130787 | A1 |   | 7/2003 | Clapper |
| 2003/0149527 | A1 |   | 8/2003 | Sikila |
| 2004/0204847 | A1 |   | 10/2004 | Yanai |

FOREIGN PATENT DOCUMENTS

| EP | 1298621 A2 | 4/2003 |
| JP | 2001141478 | 5/2001 |
| JP | 2002-213972 | 7/2002 |
| JP | 2002-329295 | 11/2002 |
| JP | 2006-105731 | * 4/2006 |
| KR | 1020040026469 | 3/2004 |
| KR | 20-357012 | 7/2004 |
| KR | 20-0357012 | 7/2004 |
| KR | 1020050017894 | 2/2005 |
| KR | 1020050033900 A | 4/2005 |
| KR | 1020050035973 | 4/2005 |
| KR | 1020050120982 | 12/2005 |
| KR | 1020060062991 | 6/2006 |

OTHER PUBLICATIONS

Notice of Preliminary Rejection from Korean Patent Office. Issuance Date: Apr. 30, 2007.

* cited by examiner

*Primary Examiner*—Michael J. Zanelli
(74) *Attorney, Agent, or Firm*—Ladas & Parry LLP

(57) ABSTRACT

A method for setting a destination based on an identifier of a moving object and a method for providing position information are disclosed. In accordance with an aspect of the present invention, there is provided a method for setting a destination based on an identifier of a moving object, including the steps of: a) selecting an identifier of moving object; b) requesting the providing of position information providing to the selected moving object; c) receiving the position information from the selected moving object; and d) setting a destination for the moving object based on the received position information.

10 Claims, 5 Drawing Sheets

FIG. 5

| Subscriber | | Application service | Requester identifier | Position information providing level | Providing period | | Etc (exception) |
|---|---|---|---|---|---|---|---|
| Identifier | Nickname | | | | Start | End | |
| 010-1111-1111 | Hong, - gil dong | Path guide (Position) | 010-1234-5678 | Always allowance | 05-00-00 01:23:45 | 10-00-00 01:23:45 | |
| | | | 010-1234-5679 | Allowance after notification | 05-00-00 01:23:45 | 10-00-00 01:23:45 | |
| | | | 010-1234-5679 | Allowance after agreement | 05-01-00 01:23:45 | 10-00-00 01:23:45 | |
| | | | 011-9999-9999 | Always refusal | 05-00-00 01:23:45 | 10-00-00 01:23:45 | |
| | | Current position providing | ALL | Always allowance | 05-00-00 01:23:45 | 10-00-00 01:23:45 | |
| 010-9999-9999 | Hong, - gil soon | Current position providing | ALL | Always refusal | 05-00-00 01:23:45 | 10-00-00 01:23:45 | |

METHOD FOR SETTING DESTINATION BASED ON IDENTIFIER OF MOVING OBJECT AND METHOD FOR PROVIDING POSITION INFORMATION

FIELD OF THE INVENTION

The present invention relates to a method for setting a destination based on an identifier of a moving object and a method for providing position information for setting the destination; and, more particularly, a method for setting a moving object as well as a fixed object as a destination, and protecting personal information by requesting/obtaining position information based on an identifier of the moving object, searching a path, and providing an authorized person with personal position information when the personal position information is requested.

DESCRIPTION OF RELATED ART

According to with an advanced mobile communication technology, if a current position and a destination are inputted to a telematics terminal, a path guide (in other words, navigation) service, which calculates an optimum path and the shortest path from the current position to the destination and provides a user with the optimum path and the shortest path as an image and a sound, is normalized. A name, an address and a telephone number are searched in order to set the destination.

Meanwhile, the difference between telematics terminal and a general navigation terminal is to have a communication module. IS 95A/B, a code division multiple access (CDMA 1x/EvDO/EVDV), a global system for mobile communication (GSM), a general packet radio service (GPRS), a wide-CDMA (WCDMA), a universal mobile telecommunications systems (UMTS) and a wireless LAN (WLAN) are used as the communication module. A high speed downlink packet access (HSDPA), a wireless broadband internet (WiBro), an ultra wand band (UWB), a broadband convergence network (BCN) and 4th-generation mobile communication will be available to the communication module.

It is required to obtain position of a telematics terminal in order to provide a telematics service. A technology which obtains a position of a telematics terminal for providing a telematics service is a position determination technology (PDT). The PDT includes a network-based PDT which obtains the position of the telematics terminal based on a position of a base station, a handset-based PDT which tracks the position of the telematics terminal based on a satellite signal, a hybrid PDT which increases position accuracy by combining the network-based PDT and the handset-based PDT. Moreover, a sensor-based PDT which tracks a position of the telematics terminal using a position sensor according to the high performance and the variety of the sensor is developed.

The network-based PDT uses an angle of arrival (AOA), a time of arrival (TOA), a time difference of arrival (TDOA). The handset-based PDT includes a satellite navigation position determination system, e.g., a global positioning system (GPS), a Galileo and a global satellite navigation system (GLONASS), and a dead reckoning (DR) system as an inertial navigation apparatus using a gyro sensor, a wheel sensor, a speed sensor, and an acceleration sensor for removing a shadow region and increasing accuracy of a satellite position determination system.

Moreover, a location based service (LBS) has been activated recently. A current telematics terminal includes a telematics terminal for a vehicle and a portable telematics terminal. Accordingly, a technology, which receives position information of a moving terminal (in other words, moving object) and searches a path, may be requested.

SUMMARY OF THE INVENTION

It is, therefore, an object of the present invention to provide a method for setting a destination based on an identifier of a moving object and a method for providing position information for setting a destination of a moving object and a fixed object and protecting personal information by requesting/obtaining position information through an identifier search of a moving object, searching a path, and providing an authorized person with personal position information when the personal position information is requested.

In accordance with an aspect of the present invention, there is provided a method for setting a destination based on an identifier of a moving object, including the steps of: a) receiving an identifier of a selected moving object; b) requesting the selected moving object to provide position information of the selected moving object; c) receiving the position information from the selected moving object; and d) setting a destination for the selected moving object based on the received position information.

In accordance with another aspect of the present invention, there is provided a method for providing position information, including the steps of: a) storing a position information providing table to provide position information; b) receiving a request to provide a position information from a requester; c) checking position information providing levels included in a position information providing table according as the requester is registered on the position information providing table; and d) providing the position information based on the position information providing levels of the requester.

BRIEF DESCRIPTION OF THE DRAWINGS

The above and other objects and features of the present invention will become apparent from the following description of the preferred embodiments given in conjunction with the accompanying drawings, in which:

FIG. 5 shows a position information providing table for providing personal position information in accordance with an embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
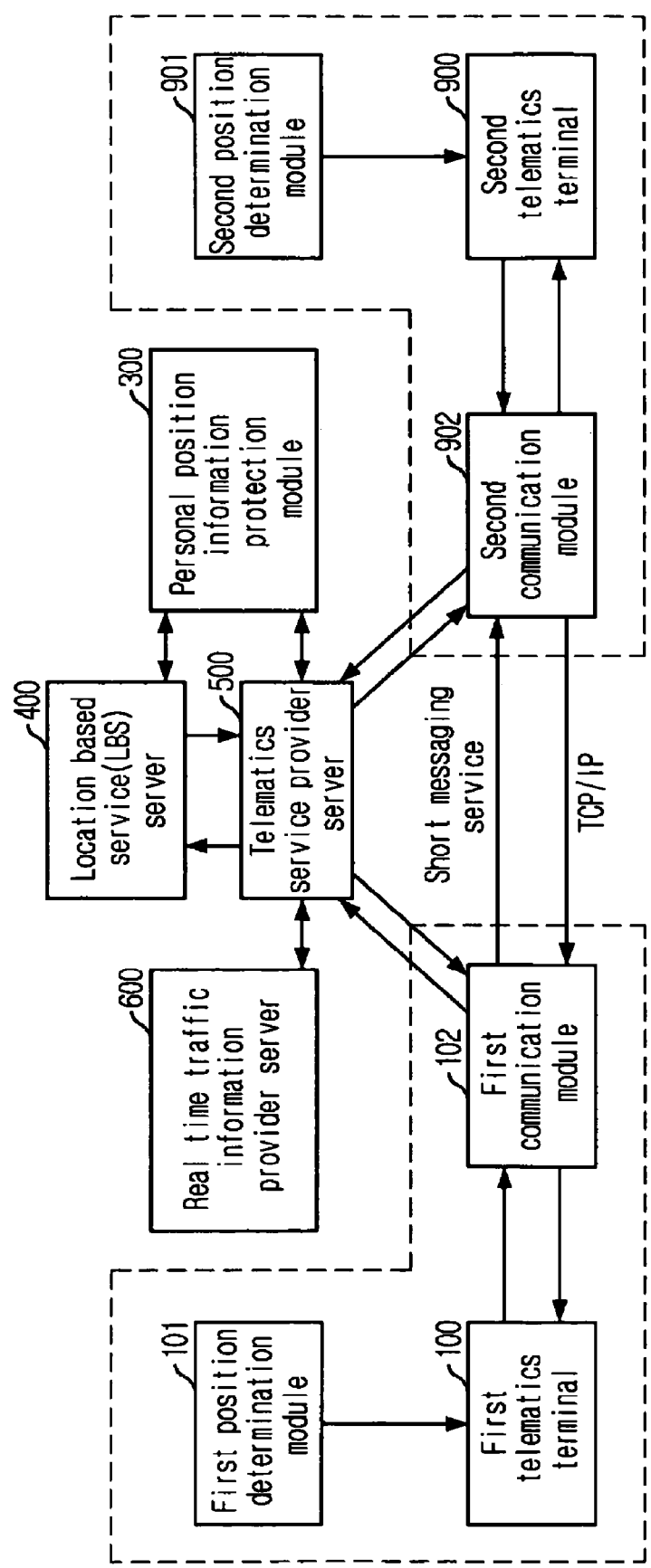
FIG. 1 is a block diagram showing a telematics service system in accordance with an embodiment of the present invention.

FIG. 1 is a block diagram showing a telematics service system in accordance with an embodiment of the present invention.

As shown in FIG. 1, the telematics service system includes a first telematics terminal 100, a second telematics terminal 900, a personal position information protecting module 300, a location based service (LBS) server 400, a telematics service provider server 500, and a real time traffic information provider server 600.

The telematics service provider server 500 communicates with the LBS server 400 and the real time traffic information provider server 600, and transmits corresponding information to the first telematics terminal 100 and the second telematics terminal 900.

In another embodiment of the present invention, the first telematics terminal 100, the second telematics terminal 900, the LBS server 400 and the real time traffic information provider server 600 may be directly connected to each other. The personal position information protecting module 300 may be included in the first telematics terminal 100 and the second telematics terminal 900. Moreover, the personal position information protecting module 300 may be included in the LBS server 400 or the telematics service provider server 500.

The first telematics terminal 100 using a first communication module 102 transceives information from/to the second telematics terminal 900 using a second communication module 902 through a short message service (SMS), a transmission control protocol/internet protocol (TCP/IP) and a hypertext transfer protocol (HTTP).

That is, the first telematics terminal 100 receives position information from the second telematics terminal 900, and checks a current position of the first telematics terminal 100 through a first position determination module 101. The first telematics terminal 100 provides a user with a path guide service by setting the position information of the first telematics terminal 100 and the second telematics terminal 900 as a start point and a destination respectively. The first telematics terminal 100 may provide the path guide service based on the traffic information which is received from the real time traffic information provider server 600.

Figure 2:
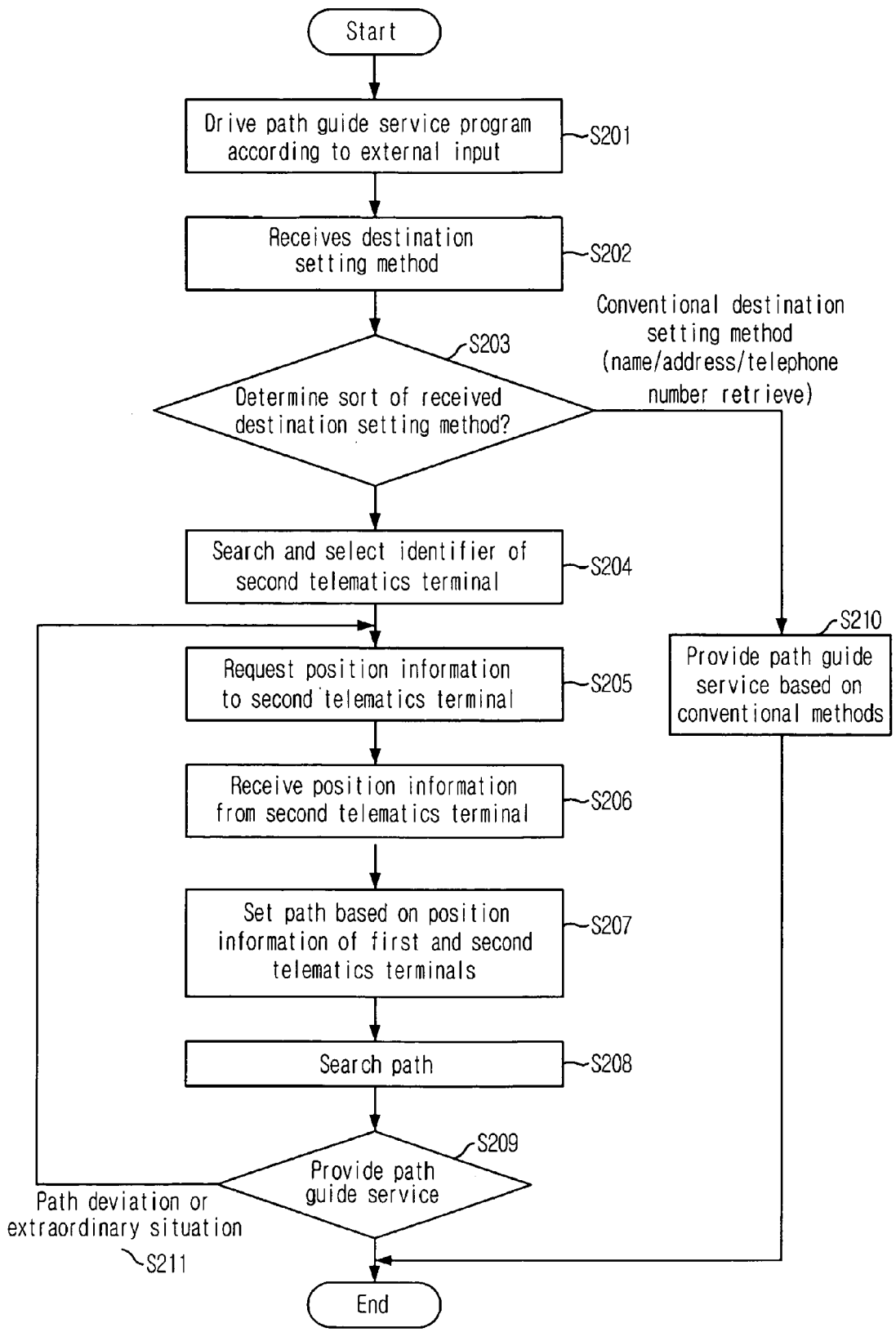
FIG. 2 is a flowchart describing a method for setting a destination based on an identifier of a moving object in accordance with an embodiment of the present invention.
Figure 4:
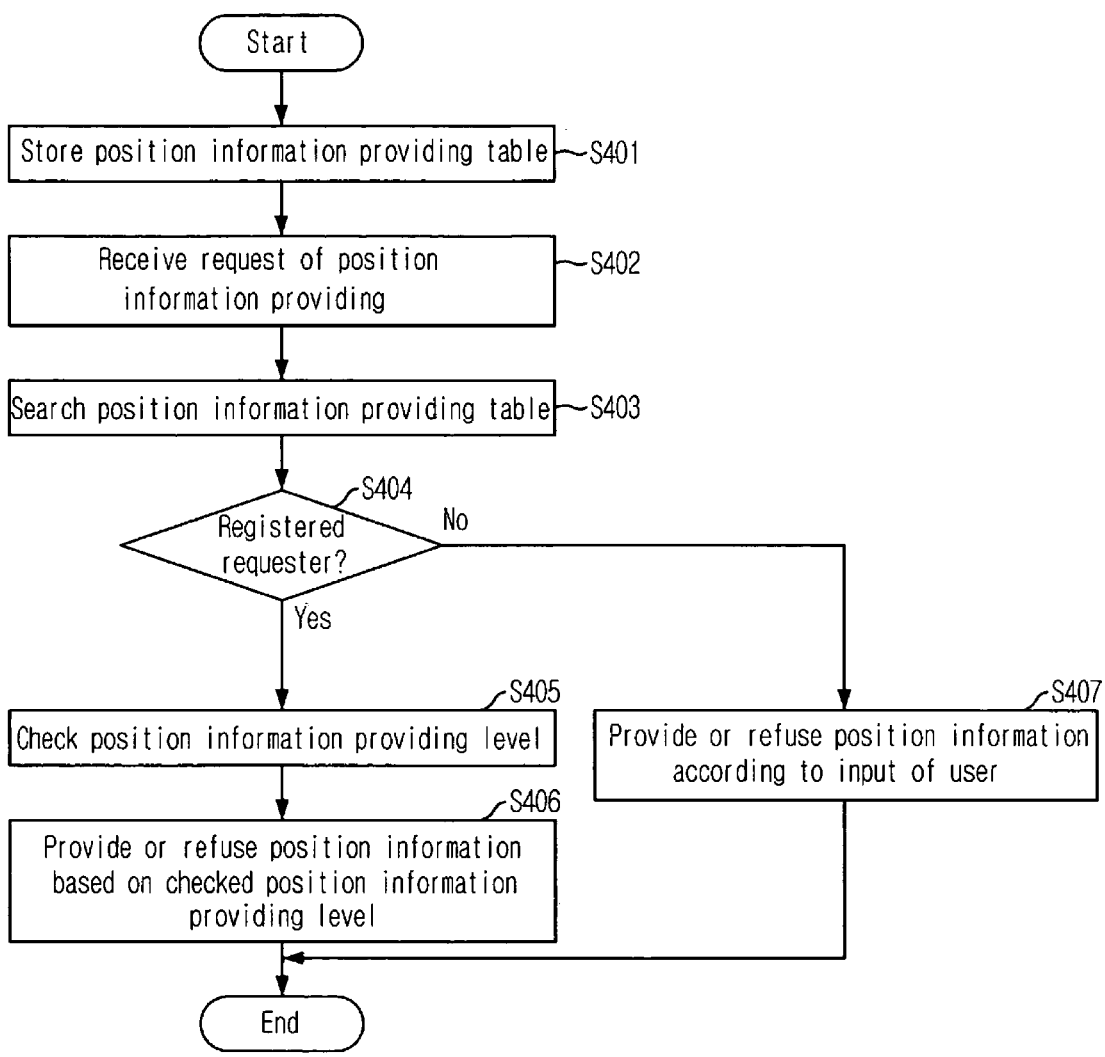
FIG. 4 is a flow chart describing a method for providing position information in accordance with an embodiment of the present invention.

Referring to FIGS. 2, 4 and 5, an operation of the first telematics terminal 100 which is start point and the second telematics terminal which is the destination 900 will be described as below.

FIG. 2 is a flowchart describing a method for setting a destination based on an identifier of a moving object in accordance with an embodiment of the present invention.

The first telematics terminal 100 drives a path guide service program according to an external input, e.g. a user input at step S201, and receives a destination setting method at step S202. A various application services for requesting position information of the telematics terminal may be started according to an external input.

The sort of the destination setting method is determined at step S203.

The identifier of the moving object as the destination setting method is provided in addition to a name, an address, a telephone number and a recent destination as a conventional destination setting method. An object terminal, a second telemactics terminal, is identified by the identifier of the moving object, e.g., a mobile telephone number and a mobile identification number (MIN) and a fixed internet protocol (IP) address.

If the conventional destination setting method is determined as the sort of the destination setting method at step S203, the position information providing service is processed by a conventional method at step S210.

If the identifier of the moving object is determined as the sort of the destination setting method at the step S203, the identifier of the moving object is searched and selected at step S204. The first telematics terminal 100 requests the position information of the second telematics terminal 900 at step S205. The first communication module 102 of the first telematics terminal 100 transceives various requests and information by communicating with the second communication module 902 of the second telematics terminal 900 through a short message service (SMS), a transmission control protocol/internet protocol (TCP/IP) and a hypertext transfer protocol (HTTP).

Then, the first telematics terminal 100 receives the position information of the second telematics terminal 900 from the second telematics terminal 900 at step S206. The first telmatics terminal 100 determines a start point and a destination based on the current position information of the first telematics terminal 100, which is obtained by the first determination module 101, and the received position information of the second telematics terminal 900 at step S207. That is, a path between the start point and the destination is set.

A path, e.g., a minimum path or an optimum path is searched at step S208. A path guide service is provided to a user at step S209. The path guide service includes multimedia data such as an image or a sound. If the moving object is deviated from the path or an extraordinary situation occurs, the path setting and the path search process are repeated at step S211.

The traffic information provided from the real time traffic information provider server 600 may be reflected on the path search. If the path search is not performed smoothly by a limitation of a CPU or a memory of the first telematics terminal 100, the telematics service provider server 500 may perform the path search and provide the first telematics terminal 100 with the result of the path search.

Figure 3A:
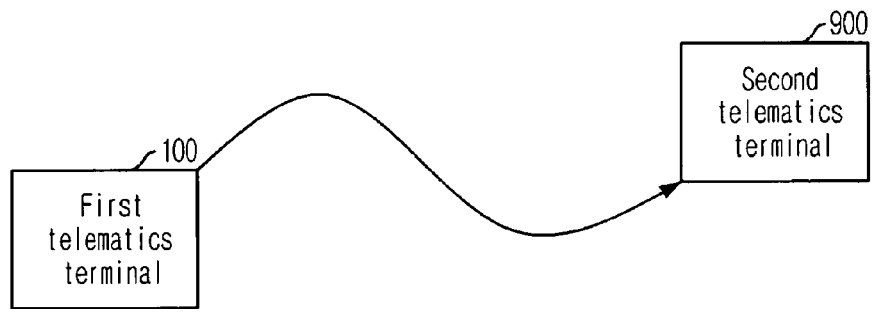
FIGS. 3A to 3C shows a path search according to a moving state of a target terminal in an embodiment of the present invention.
Figure 3B:
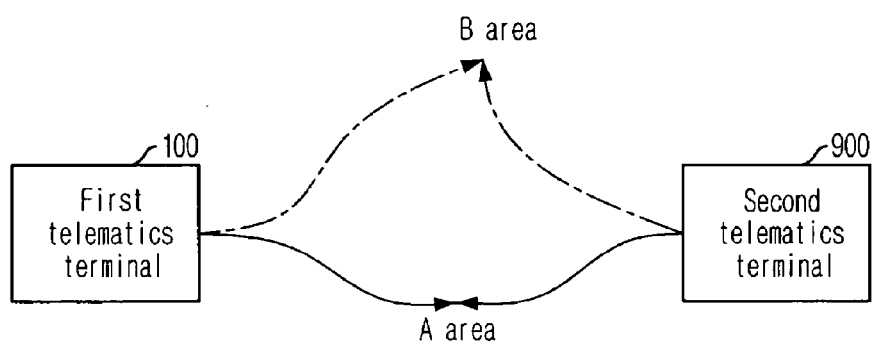
Figure 3C:
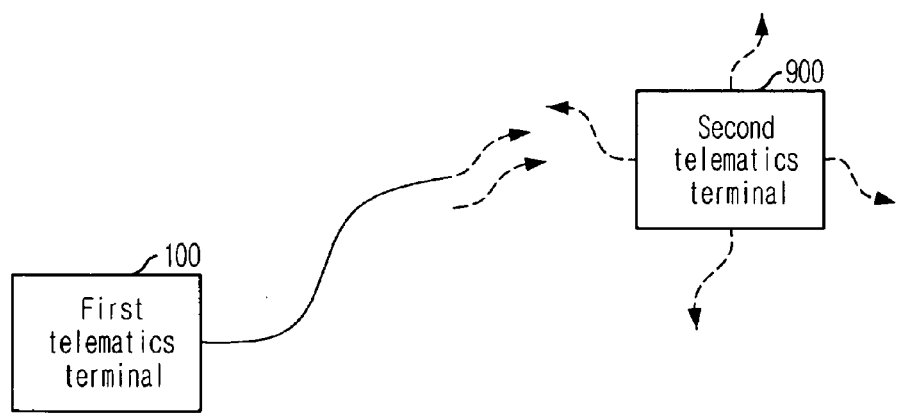

FIGS. 3A to 3C show a path search according to a moving state of an object terminal in an embodiment of the present invention.

FIG. 3A shows a path search in the first telematics terminal 100 in a case that a second telematics terminal 900 is on standby at a specific position for an emergency rescue, e.g., an emergency call and etc. If the second telematics terminal 900 starts to move, the second telmatics terminal 900 transmits the position information (moving information) of the second telematics terminal 900 to the first telematics terminal 100 based on the information protection.

FIG. 3B shows a path search in a case that the first telematics terminal 100 and the second telematics terminal 900 move respectively and search a path between a start point and a middle place (A area) or a meeting place. The middle place denotes a temporal middle point, which reflects a traffic situation, such as a parking area and a point of interest (POI). The meeting place denotes a specific place which is designated by the first and second telematics terminals 100 and 900. A destination is set based on post-position information on a moving path and necessary time information between the current position and the post-position.

FIG. 3C shows a path search of the first telematics terminal 100 when a moving path of the second telematics terminal 900 is unknown. The position information of the second telematcis terminal 900 is updated periodically or non-periodically and is transmitted to the first telematics terminal 100. The path setting and the path search process are repeated.

FIG. 4 is a flow chart describing a method for providing position information in accordance with an embodiment of the present invention.

The second telematics terminal 900 stores a position information providing table for providing position information of a user at step S401.

The second telematics terminal 900 receives a request of position information providing from the first telematics terminal 100 through the second communication module 902 at step S402.

The second telematics terminal 900 retrieves the position information providing table at step S403 and checks whether or not the first telematics terminal 100 is registered on the position information providing table at step S404.

If the registration of the first telematics terminal 100 is confirmed through the position information providing table at the step S404, the second telematics terminal 900 checks a position information providing level of the first telematics terminal 100 at step S405. The position information is provided or refused based on the checked position information providing level of the first telematics at step S406.

The position information providing levels include four levels, "refusal of position information providing (always refusal)", "position information providing after agreement (allowance after agreement)", "position information providing after notification (allowance after notification)" and "position information providing (always allowance).

If the position information providing level of the first telematics terminal 100 is the "refusal of position information providing", the position information is not provided to the first telematics terminal 100.

If the position information providing level of the first telematics terminal 100 is the "position information providing after agreement (allowance after agreement)", the position information is provided or refused after the second telematics terminal 900 requests a user an agreement regarding the position information providing.

If the position information providing level of the first telematics terminal 100 is "position information providing after notification (allowance after notification)", the position information is provided to the first telematics terminal 100 after the second telematics terminal 900 notifies the position information providing to the first telematics terminal.

If the position information providing level of the first telematics terminal 100 is "position information providing (always allowance)", the position information is provided to the first telematics terminal 100.

If the registration of the first telematics terminal 100 is not confirmed through the position information providing table at the step S404, the position information is provided or refused after the second telematics terminal 900 requests an agreement of a user regarding position information providing to a user. Then, the position information is registered on the position information providing table according to an input of the user at step S407.

FIG. 5 shows a position information providing table for providing personal position information in accordance with an embodiment of the present invention.

The position information providing levels in the position information providing table may be changed according to a combination of each field in the position information providing levels, e.g., a subscriber (e.g. identifier and nick name), an application service (e.g. path guide service, position information providing service), a requester (e.g. identifier), a providing period (e.g. start and end) and etc (e.g. exception).

That is, since various fields are set and the position information providing levels are changed according to the combination of the fields, different position information providing levels, which are classified by each requester, service, and time period, may be provided.

The position information providing levels may be provided step by step. For example, although the same requester requests position information for same application service, a part or whole levels of the position information providing levels may be provided according to a requesting time.

In detail, the second telematics terminal 900 checks an identifier, the sort of application service (e.g., path guide service and position information providing service) and a providing period of the first telematics terminal 100, and performs an operation based on the position information providing levels in which the first telematics terminal 100 is included by receiving the request of position information from the first telematics terminal 100.

For example, if the second telematics terminal 900 receives a request of position information from the first telematics terminal 100 having an identifier of "010-1234-5678", the second telematics terminal 900 confirms the providing period and the application service sorts, and provides the first telematics terminal 100 with the position information directly without the agreement process of a user according to the validation of the confirmed result.

For example, if the second telematics terminal 900 receives a request of position information from the first telematics terminal 100 having an identifier of "010-9999-9999", the second telematics terminal 900 confirms the providing period and the application service sorts, and refuses a request of position information providing of the first telematics terminal 100 without the agreement process of the user according to the sameness with the data recorded in the position information providing table.

In a case of the etc (e.g. exception) filed, an exception case and an application rule of the position information providing level are defined by an extra format.

In a case that the second telematics terminal 900 does not have the second position determination module 901, the second telematics terminal 900 may receive the position information of the second telematics terminal 900 from the LBS server 400, and provide the first telelmatics terminal 100 with the received position information.

In a case that the second telematics terminal 900 does not have the second position determination module 901, the second telematics terminal 900 may allow the first telematics terminal 100 to receive the position information of the second telematics terminal 900 from the LBS server 400 directly.

As described above, the present invention provides a path guide service between a start position and a dynamic destination by setting a destination through an identifier search of a moving object (telematics terminal for a vehicle or a portable telematics terminal), and protects personal position information by providing the position information according to the position information providing level.

As above-mentioned, the method of the present invention can be embodied as a program and stored in recording media readable by a computer, e.g., CD-ROM, RAM, floppy disk, hard disk, magneto-optical disk, etc.

The present application contains subject matter related to Korean paten application No. 2005-119422 and 2006-52742, filed in the Korean Patent Office on Dec. 8, 2005, and Jun. 12, 2006, respectively, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for setting a destination based on an identifier of a moving object, comprising the following computer-implemented steps:

a) receiving an identifier of a selected moving object;

b) requesting the selected moving object to provide position information of the selected moving object;

c) receiving the position information from the selected moving object; and d) setting a destination for the selected moving object based on the received position information, wherein the setting of the destination for the selected moving object is configured based on a selected position information providing level stored in a table, wherein the selected position information stored in the table is configured based on a plurality of different position information providing levels according to a combination of a plurality of item fields, wherein the plurality of item fields includes at least one of a subscriber, an application service, a requester and a providing period, wherein the received position information is configured based on one of the plurality of different position information levels in combination with the plurality of item fields, wherein in the step c), if the selected moving object does not have a position determination module, the position information is received from an external location based service (LBS) server.

2. The method as recited in claim 1, further comprising the steps of:

e) searching a path for the destination which is set at the step d); and f) providing a path guide service based on the path search result.

3. The method as recited in claim 2, wherein in the step e), one of an optimum path and a minimum path is searched.

4. The method as recited in claim 2, wherein in the step e), the path is searched based on real time traffic information which is provided from an external apparatus.

5. The method as recited in claim 2, wherein in the step f), the path guide service is provided based on a multimedia data format.

6. The method as recited in claim 1, wherein in the step a), at least one of a mobile communication telephone number, a mobile identification number and a fixed internet protocol(IP) is selected as the identifier of the selected moving object by an external input.

7. The method as recited in claim 1, wherein in the step c), the position information is received from the selected moving object periodically, and wherein in the step d), the destination setting for the selected moving object is performed repeatedly based on the period.

8. The method as recited in claim 7, wherein in the step c), the position information of the selected moving object to be moved on a moving path and necessary time information between the current time and a moving completion time are received from the selected moving object periodically, wherein in the step d), the destination setting for the selected moving object is performed repeatedly based on the position information of the selected moving object to be moved and the necessary time information according to the period.

9. The method as recited in claim 1, wherein in the step c), the position information is received from the moving object aperiodically, and wherein in the step d), the destination setting for the moving object is performed repeatedly according as the position information is received from the moving object newly.

10. The method as recited in claim 9, wherein in the step c), the position information of the moving object to be moved on a moving path and time difference information between the current time and a moving completion time are received from the moving object aperiodically, wherein in the step d), the destination setting for the moving object is performed repeatedly based on the position information of the selected moving object to be moved and the necessary time information according as the position information is received from the selected moving object newly.

* * * * *